(12) United States Patent
Lethellier

(10) Patent No.: US 6,424,129 B1
(45) Date of Patent: Jul. 23, 2002

(54) METHOD AND APPARATUS FOR ACCURATELY SENSING OUTPUT CURRENT IN A DC-TO-DC VOLTAGE CONVERTER

(75) Inventor: Patrice R. Lethellier, Oxnard, CA (US)

(73) Assignee: Semtech Corporation, Newbury Park, CA (US)

( * ) Notice: Subject to any disclaimer, the term of this patent is extended or adjusted under 35 U.S.C. 154(b) by 0 days.

(21) Appl. No.: 09/935,286

(22) Filed: Aug. 21, 2001

(51) Int. Cl.$^7$ ................................................. G05F 1/40
(52) U.S. Cl. ......................... 323/272; 323/290; 323/282
(58) Field of Search ................................. 323/290, 282, 323/272, 284

(56) References Cited

U.S. PATENT DOCUMENTS

| | | | |
|---|---|---|---|
| 5,982,136 A | 11/1999 | Pelly | |
| 5,982,160 A | 11/1999 | Walters et al. | |
| 6,094,038 A | 7/2000 | Lethellier | |
| 6,150,803 A | * 11/2000 | Varga | 307/60 |
| 6,160,388 A | 12/2000 | Skelton et al. | |
| 6,166,528 A | 12/2000 | Rossetti et al. | |
| 6,219,262 B1 | 4/2001 | Burgyan | |
| 6,246,220 B1 | 6/2001 | Isham et al. | |
| 6,346,798 B1 | * 2/2002 | Passoni et al. | 323/272 |

* cited by examiner

Primary Examiner—Shawn Riley
(74) Attorney, Agent, or Firm—O'Melveny & Myers LLP

(57) ABSTRACT

An apparatus and method for accurately sensing the output current delivered to a load by a buck-type DC-to-DC switched mode power converter corrects for thermal variation of the output inductor. A first current sense signal provides a fast indication of output current of the DC-to-DC converter that is susceptible to thermal variation of the output inductor of the converter, and a second current sense signal provides a slow but accurate indication of output current that is not affected by said thermal variation. The first current sense signal is corrected using the second current sense signal to yield accurate output current sensing information. In an embodiment of the invention, an output current sensing apparatus is provided for use in a multiphase DC-to-DC voltage converter comprising a plurality of converter modules connected to a common load and having a common input voltage source. A first current sensor is adapted to be coupled to an output inductor of at least one of the plurality of converter modules to derive a first current sense signal corresponding to current passing through an internal DC resistance of the output inductor. A second current sensor is adapted to be coupled to a sensing resistor disposed in series between the common input voltage source and the load to derive a second current sense signal corresponding to current passing through the sensing resistor. A current sense circuit receives the first and second current sense signals. The current sense circuit filters the second current sense signal, integrates a difference between the first current sense signal and the filtered second current sense signal, and adjusts attenuation of the first current sense signal based on the integrated difference. The current sense circuit thereby provides the first current sense signal as a slope signal for controlling a conduction duty cycle of the DC-to-DC converter and a DC level signal corresponding to a thermal drift error of the slope signal.

25 Claims, 4 Drawing Sheets

METHOD AND APPARATUS FOR ACCURATELY SENSING OUTPUT CURRENT IN A DC-TO-DC VOLTAGE CONVERTER

BACKGROUND OF THE INVENTION

1. Field of the Invention

The present invention relates to voltage regulator circuits. More particularly, the invention relates to the sensing of output current delivered to a load by a buck-type DC-to-DC switched mode power converter.

2. Description of Related Art

Switched mode DC-to-DC power converters are commonly used in the electronics industry to convert an available direct current (DC) level voltage to another DC level voltage. A switched mode converter provides a regulated DC output voltage by selectively storing energy by switching the flow of current into an output inductor coupled to a load. A synchronous buck converter is a particular type of switched mode converter that uses two power switches, such as MOSFET transistors, to control the flow of current in the output inductor. A high-side switch selectively couples the inductor to a positive power supply while a low-side switch selectively couples the inductor to ground. A pulse width modulation (PWM) control circuit is used to control the gating of the high-side and low-side switches. Synchronous buck converters generally offer high efficiency and high power density, particularly when MOSFET devices are used due to their relatively low on-resistance. Therefore, synchronous buck converters are advantageous for use in providing power to electronic systems having demanding power requirements, such as microprocessors that require a control voltage ($V_{cc}$) of 1 to 1.5 volts with current ranging from 40 to 60 amps. For certain applications having especially high current load requirements, it is known to combine plural synchronous buck converters together in multi-phase configurations operated in an interleaf mode.

To regulate the performance of a synchronous buck converter, it is known to monitor the amount of current sent to the load. This information is important to protect the load from damage caused by excessive current, to ensure that sufficient current is delivered to the load in view of changing load conditions (i.e., controlling voltage "droop" caused by a step up in load), and to permit current sharing between phases of multi phase configurations. One approach to measuring the load current is to include a sensing resistor in series with the output inductor and to monitor the voltage drop across the sensing resistor. The sensing resistor must have a resistance value large enough to keep the sensed voltage signal above the noise floor, as the voltage drop can be measured more accurately with a higher resistance value. A significant drawback of this approach is that the sensing resistor wastes the output energy and thereby reduces the efficiency of the synchronous buck converter. Moreover, the sensing resistor generates heat that must be removed from the system.

Another approach to measuring the load current is to place the sensing resistor in series with the drain of the high-side switch (i.e., MOSFET) and monitor the voltage drop across the sensing resistor as in the preceding approach. In this position, the amount of energy dissipated by the sensing resistor is substantially less than in the aforementioned position in series with the output inductor. A drawback of this approach is that the high-side switch changes state at a relatively high rate (e.g., greater than 250 KHz) and, as a result, the high-side switch current is discontinuous. When the high-side switch turns on, the current through the switch and the sensing resistor starts at zero and increases rapidly before settling and then returning to zero when the high-side switch turns off. The information obtained from sampling the voltage across the sensing resistor must therefore be utilized during a subsequent switching cycle, making it necessary to include "sample and hold" circuitry to store the sampled information from cycle to cycle. Not only does this add complexity to the converter, but there is also a time delay in regulating the output current that diminishes the stability of the converter.

In yet another approach to measuring the load current, a current sensor is included in parallel with the output inductor. The current sensor includes a resistor and capacitor connected together in series. The signal passing through the output inductor has a DC component and an AC component. The output inductor is comprised of a wire, such as copper, that has an inherent resistance per unit length that results in a DC resistance value. The AC component of the signal depends on the inductance and internal resistance values of the output inductor, as well as the resistance and capacitance of the current sensor. By selecting the values of the resistor and capacitor to define a time constant having a known relationship with the corresponding time constant of the output inductor, the instantaneous voltage across the capacitor can be made equal to the voltage across the DC resistance of the inductor and thereby proportional to the instantaneous current through the output inductor. Thus, the output inductor current can be sensed without dissipating the output energy by monitoring the voltage across the capacitor. A drawback of this approach is that the DC resistance of the output inductor will change with temperature since the copper material of the output inductor has a thermal coefficient. This introduces a DC error that affects the accuracy of the measurement of the output inductor current and diminishes the stability of the converter.

Accordingly, it would be desirable to provide a way to accurately sense the output current delivered to a load by a buck-type DC-to-DC switched mode power converter that corrects for thermal variation.

SUMMARY OF THE INVENTION

The present invention provides an apparatus and method for accurately sensing the output current delivered to a load by a buck-type DC-to-DC switched mode power converter that corrects for thermal variation. According to the invention, a first current sense signal provides a fast indication of output current of the DC-to-DC converter that is susceptible to thermal variation of the output inductor of the converter, and a second current sense signal provides a slow but accurate indication of output current that is not affected by said thermal variation. The first current sense signal is corrected using the second current sense signal to yield accurate output current sensing information.

In an embodiment of the invention, an output current sensing apparatus is provided for use in a multi-phase DC-to-DC voltage converter comprising a plurality of converter modules connected to a common load and having a common input voltage source. A first current sensor is adapted to be coupled to an output inductor of at least one of the plurality of converter modules to derive a first current sense signal corresponding to current passing through an internal DC resistance of the output inductor. A second current sensor is adapted to be coupled to a sensing resistor disposed in series between the common input voltage source and the load to derive a second current sense signal corresponding to current passing through the sensing resistor. A current sense circuit receives the first and second current sense signals. The current sense circuit filters the second current sense signal, integrates a difference between the first current sense signal and the filtered second current sense signal, and adjusts the first current sense signal based on the integrated difference. The current sense circuit thereby provides the first current sense signal as a slope signal for controlling a conduction duty cycle of the DC-to-DC converter and a DC level signal corresponding to a thermal drift error of the slope signal.

More particularly, the first current sensor further comprises a resistor and a capacitor connected together in series and connected in parallel with the output inductor of the at least one of the plurality of converter modules. With regard to the second current sensor, the sensing resistor is further disposed in series between the common input voltage source and a high-side conduction switch of the plurality of converter modules. The second current sensor further comprises a differential amplifier adapted to measure a voltage across the sensing resistor and a sample and hold circuit that stores the voltage for at least one conduction cycle of the DC-to-DC converter. Alternatively, the sensing resistor may be disposed in series between the output inductor of the at least one of the plurality of converter modules and the load. In that case, the second current sensor further comprises a differential amplifier adapted to measure a voltage across the sensing resistor, and a sample and hold circuit is not needed.

In another embodiment of the invention, a method for sensing output current in a multi-phase DC-to-DC voltage converter is provided. A first current sense signal is derived corresponding to current passing through an internal DC resistance of an output inductor of at least one of the plurality of converter modules. The first current sense signal provides a relatively fast indication of output current of the multi-phase DC-to-DC converter that is susceptible to thermal variation of the at least one output inductor. A second current sense signal is derived corresponding to current passing through a sensing resistor disposed in series between the common input voltage source and the load. The second current sense signal provides a relatively slow but accurate indication of output current that is not affected by thermal variation. The second current sense signal is filtered to remove noise therefrom. An integrated difference is derived between the first current sense signal and the filtered second current sense signal. Then, the first current sense signal is corrected based on the integrated difference. As in the previous embodiment, the second current sense signal may be derived from the sensing resistor disposed in series between the common input voltage source and a high-side conduction switch of at least one of the plurality of converter modules, or from the sensing resistor disposed in series between the output inductor of the at least one of the plurality of converter modules and the load.

A more complete understanding of the method and apparatus for accurately sensing output current in a DC-to-DC voltage converter will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

The present invention satisfies the need for a way to accurately sense the output current delivered to a load by a buck-type DC-to-DC switched mode power converter that corrects for thermal variation. In the detailed description that follows, like element numerals are used to describe like elements illustrated in one or more of the drawings.

Figure 1:
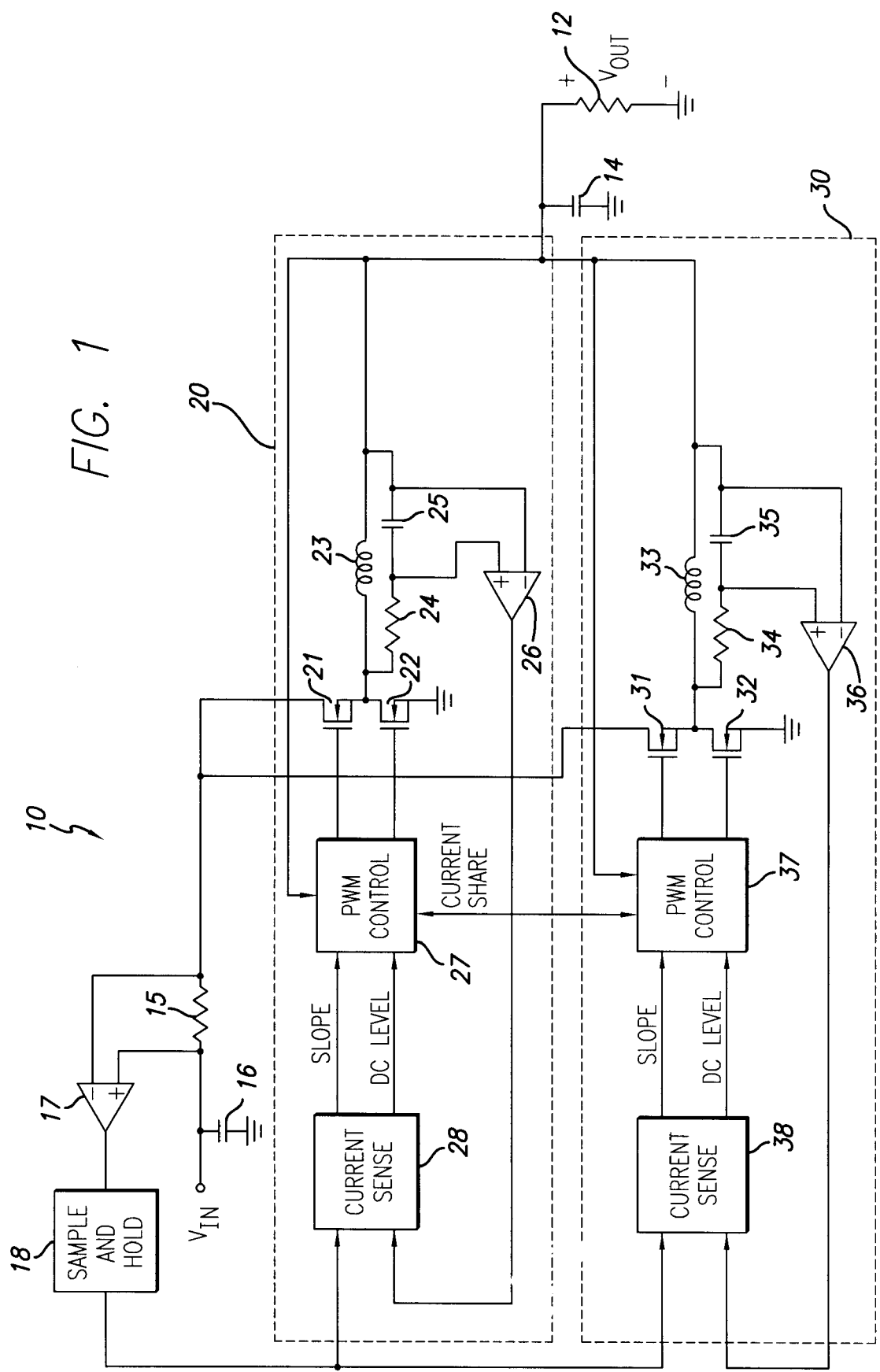
FIG. 1 is a simplified schematic diagram of a multiphase DC-to-DC voltage converter having an output current sense circuit in accordance with an embodiment of the invention.

Referring first to FIG. 1, a multi-phase DC-to-DC voltage converter 10 is illustrated in accordance with an embodiment of the invention. The multi-phase DC-to-DC voltage converter 10 includes single-phase converter modules 20, 30 that each provide a regulated output voltage ($V_{OUT}$) to a load 12. A capacitor 14 is connected to the phase converter modules 20, 30 in parallel with the load 12 to provide smoothing of the output voltage $V_{OUT}$. An input voltage source ($V_{IN}$) is connected to each of the phase converter modules 20, 30. It should be appreciated that the multi-phase DC-to-DC voltage converter may have more than two converter modules, and that two such converter modules are illustrated in FIG. 1 for ease of explanation. Moreover, while the invention is described in the context of a multi-phase DC-to-DC voltage converter, it will be appreciated that the inventive concepts described hereinbelow are equally applicable to a single-phase DC-to-DC voltage converter.

The first single-phase converter module 20 includes a high-side switch 21 and a low-side switch 22 connected to an input voltage source ($V_{IN}$). In a preferred embodiment of the invention, the high-side switch 21 and the low-side switch 22 are provided by respective MOSFET devices, with the drain of high-side switch 21 connected to the input voltage source $V_{IN}$, the source of the high-side switch 21 connected to the drain of the low-side switch 22, and the source of the low-side switch 22 connected to ground. An output inductor 23 is connected in series between the load 14 and the junction between the source of the high-side switch 21 and the drain of the low-side switch 22. A pulse width modulation (PWM) control circuit 27 is connected to the gates of both the high-side switch 21 and low-side switch 22, and generates a series of pulse width modulated control pulses for the switches 21, 22 to regulate the output voltage $V_{OUT}$ coupled to the load 12. A current sense circuit 28 is connected to the PWM control circuit 27, and provides signals that control the operation of the PWM control circuit 27 based on a measure of the output current (as will be further described below).

The second single-phase converter module 30 has generally identical construction as the first single-phase converter module 20, and includes high-side switch 31, low-side switch 32, output inductor 33, and PWM control device 37 corresponding to the like components of the first single-phase converter module. The high-side switch 31 is connected to the input voltage source $V_{IN}$ in parallel with the high-side switch 21 of the first single-phase converter module 20, and the output inductor 33 is connected to the load 12 in parallel with the output inductor 23 of the first single-phase converter module 20.

The PWM control circuits 27, 37 and the current sense circuits 28, 38 operate to regulate the output current delivered the load 12. The PWM control circuits 27, 37 receive as inputs an output voltage feedback signal coupled to the load 12, and slope and DC level signals from the current sense circuits 28, 38. The slope signal defines the conduction duty cycle in which the high-side and low-side switches are gated for each of the converter modules 20, 30. The DC level signal defines a voltage error of the slope signal used to control output current limit (to protect the load), current sharing between converter modules 20, 30, a current droop due to a step up in load. A current sharing bus links the PWM control circuits 27, 37 of the converter modules 20, 30 together in order to share load current between each of the phases of the converter modules. Those of ordinary skill in the art will understand the construction and operation of the PWM control circuit 27 without requiring further detailed discussion.

The current sense circuits 28, 38 each receive a pair of current sense signals, including a first current sense signal that detects the current through the output inductors 23, 33, and a second current sense signal that detects the current into the drains of the high-side switches 21, 31. The first current sense signal provides a fast and clean indication of the output current, but that is susceptible to errors due to thermal variation. The second current sense signal provides a slow but accurate indication of the output current that is not affected by thermal variation. The second (i.e., slow) current sense signal is used to correct the amplitude of the first (i.e., fast) current sense signal. The two signals together yield a highly accurate measurement of the output current. Since thermal drift is a relatively slow process, the second (i.e., slow) current sense signal is nevertheless fast enough to compensate for thermal drift of the first current sense signal.

With reference to the first converter module 20, the first current sense signal is derived by a first current sensor that includes a resistor 24 and a capacitor 25 connected in parallel with the output inductor 23. As described above, with proper selection of the values of the resistor 24 and capacitor 25, the voltage across the capacitor 25 corresponds to the voltage across the DC resistance of the output inductor 23. In a preferred embodiment of the invention, a highly temperature stable capacitor (e.g., NPO or COG) may be utilized. The voltage across the capacitor 25 is measured using a differential amplifier 26 that has inputs connected to either end of the capacitor. The output of the differential amplifier 26 provides the first current sense signal to the current sense circuit 28. Similarly, the second converter module 30 includes a current sensor comprising a resistor 34, capacitor 35, and differential amplifier 36 arranged in like fashion to provide the first current sense signal to the current sense circuit 38. The second current sense signal is derived by a second current sensor that includes a sensing resistor 15 connected in series between the input voltage source $V_{IN}$ and the drains of the high-side switches 21, 31. The voltage across the sensing resistor 15 is measured using a differential amplifier 17 that has inputs connected to either end of the resistor. The output of the differential amplifier 17 is connected to a sample and hold circuit 18 that stores the sampled information from cycle to cycle to provide the second current sense signal to the current sense circuit 38.

Figure 2:
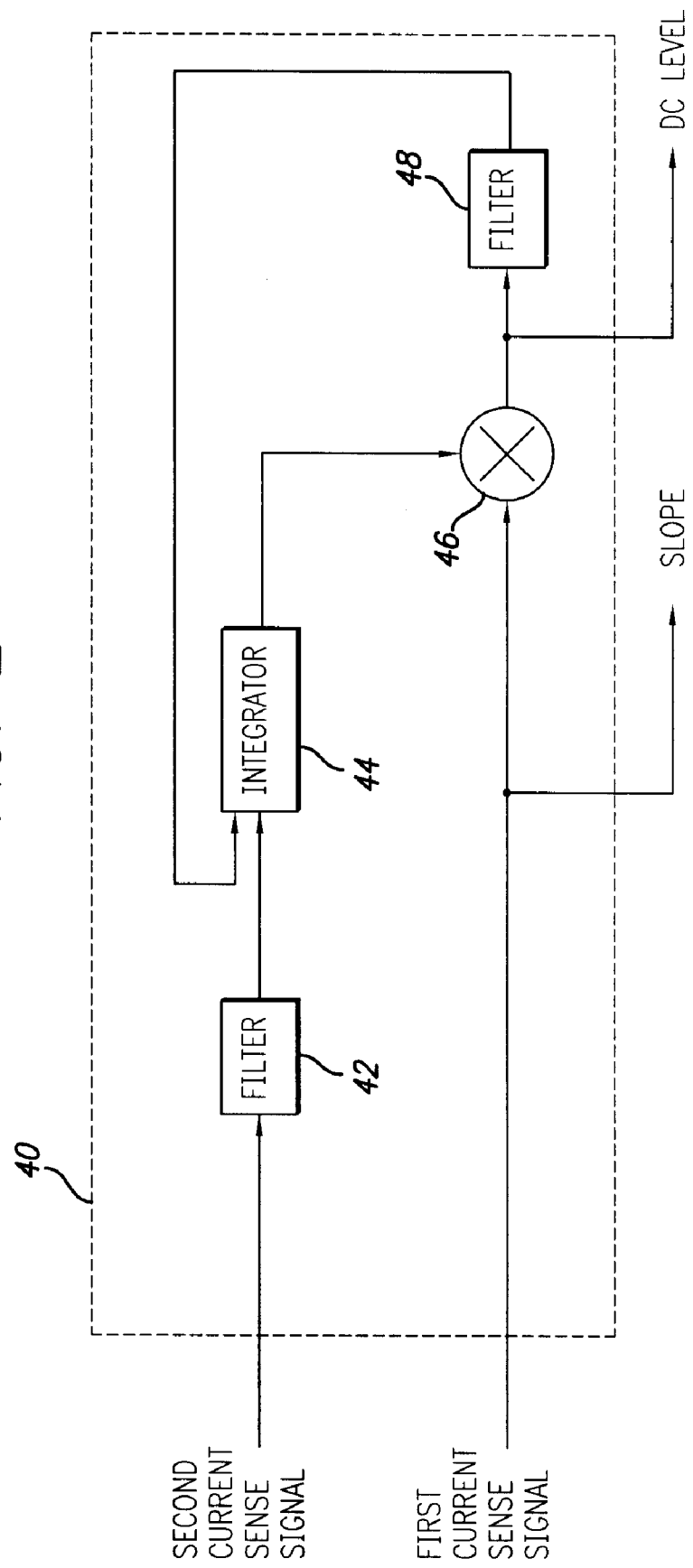
FIG. 2 is a block diagram of an exemplary output current sense circuit.

Referring now to FIG. 2, a block diagram of an exemplary output current sense circuit 40 is shown. The current sense circuit 40 of FIG. 2 corresponds to the current sense circuits 28, 38 of FIG. 1. The current sense circuit 40 further includes a first filter 42, an integrator 44, a mixer 46, and a second filter 48. The first current sense signal derived from the output inductor is provided directly to the mixer 46. Prior to the mixer 46, the first current sense signal provides the slope signal that is provided to the PWM control circuits, and the output of the mixer 46 provides the DC level signal that is provided to the PWM control circuits (as described above). The second current sense signal derived from the sample and hold circuit 18 passes through the first filter 42 to the integrator 44. The output of the mixer 46 also passes through the second filter 48 and is provided to the integrator 44. The filters 42, 48 remove AC components of the signals, and may be provided by a filter capacitor. The integrator 44 integrates the difference between the two input signals provided thereto and adjusts the attenuation factor of the mixer 46 based on the integrated difference. The filters 42, 48 and the integrator 44 tend to slow the processing of the second current sense signal (e.g., on the order of a few milliseconds) in relation to the first current sense signal. But, since this time delay is very small compared to thermal variations that have a very long time constant, the adjustment to the first current sense signal is sufficiently fast to yield accurate regulation of the voltage converter.

By way of example, when the first current sense signal is accurate (i.e., no thermal variation), there should be no difference between the two signals applied to the integrator 44. In that condition, there will be no need to correct the amplitude of the first current sense signal. In an embodiment of the invention, the integrator 44 will provide an output corresponding to 1, so the mixer 46 will divide the first current sense signal by 1 yielding no change in the first current sense signal. But, when there is thermal variation to the first current sense signal this difference is detected by the integrator 44, and the mixer will increase or decrease the first current sense signal by an appropriate amount. For example, if the thermal variation is roughly 10% over an ambient temperature, this difference will be reflected by integrator 44 and the mixer 46 will divide the first current sense signal by 1.1 rather than 1. The DC level signal will therefore reflect the corrected current sense signal. Thus, the error signal generated by the integrator 44 corrects the first current sense signal so that its averaged amplitude is proportional to the second current sense signal.

Figure 3:
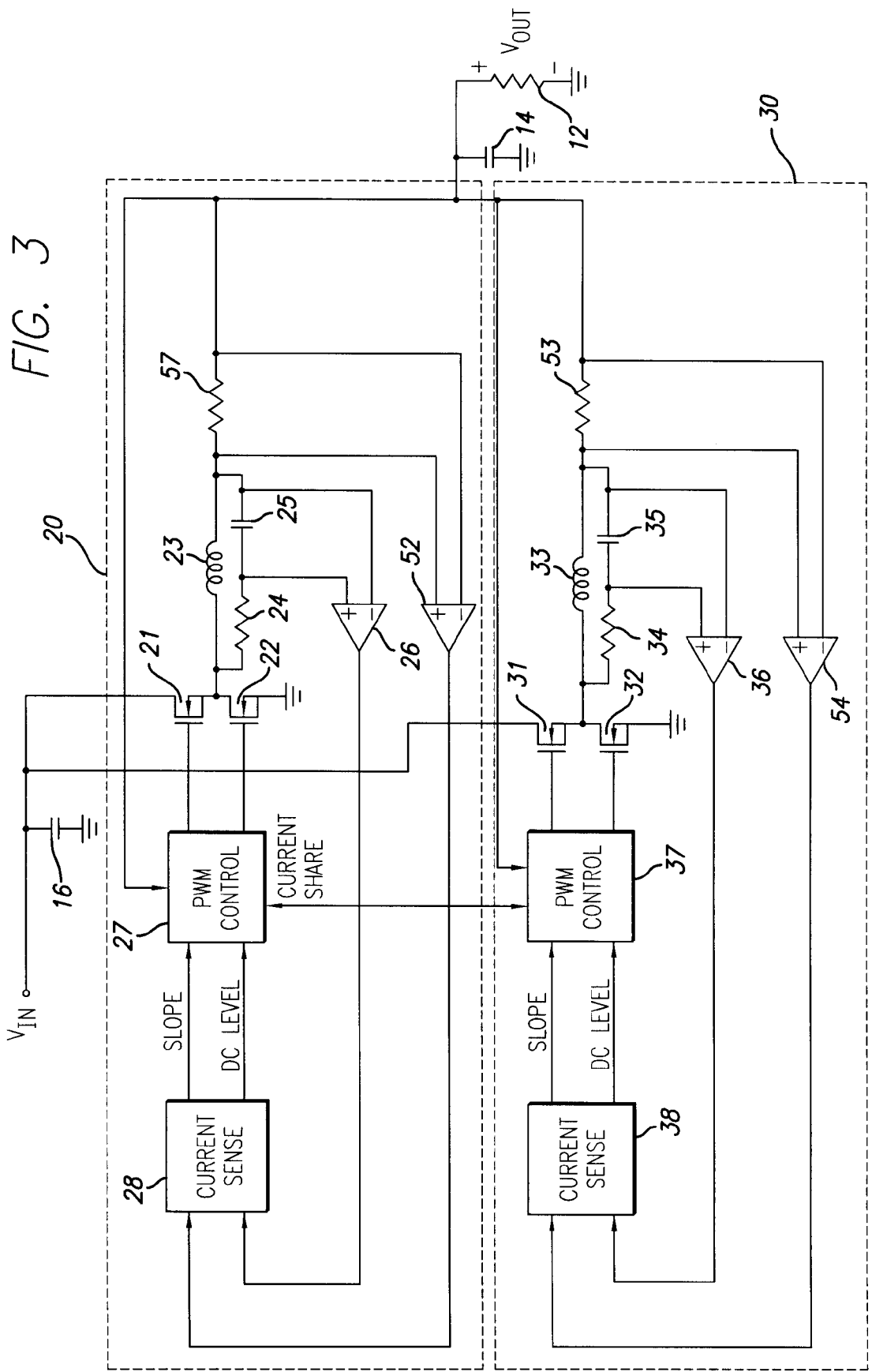
FIG. 3 is a simplified schematic diagram of a multiphase DC-to-DC voltage converter having an output current sense circuit in accordance with an alternative embodiment of the invention.

Referring now to FIG. 3, an alternative embodiment of a multiphase DC-to-DC voltage converter 10 is illustrated in accordance with an embodiment of the invention. The embodiment of FIG. 3 is generally similar to that shown in FIG. 1, with the exception that the second current sense signal is derived from a sensing resistor disposed in series with the load 12. Specifically, in the first converter module 20, a sensing resistor 57 is connected in series between the output inductor 23 and the load 12. The voltage across the sensing resistor 57 is measured using a differential amplifier 52 that has inputs connected to either end of the resistor. The output of the differential amplifier 52 provides the second current sense signal to the current sense circuit 28. It should be appreciated that this embodiment does not require a sample and hold circuit for the second current sense signal since the current through the sensing resistor 57 is continuous. In a preferred embodiment of the invention, the sensing resistor 57 would have a very low resistance value in order to reduce the amount of power that is lost by inclusion of the sensing resistor. The second converter module would also include a sensing resistor 53 and differential amplifier 54 arranged in a similar manner. The current sense circuits 28, 38 would operate in the same manner described above.

Figure 4:
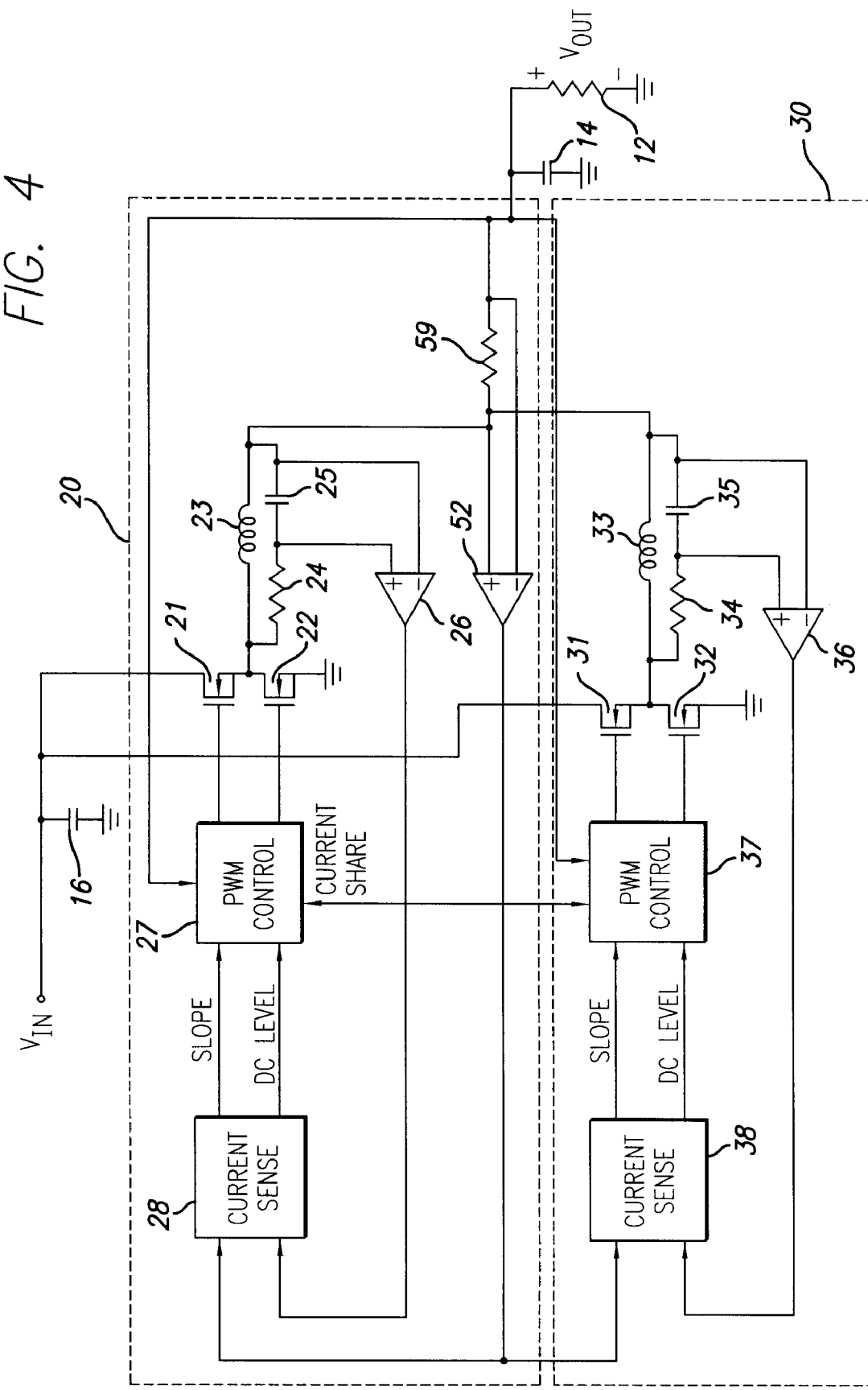
FIG. 4 is a simplified schematic diagram of a multiphase DC-to-DC voltage converter having an output current sense circuit in accordance with a third alternative embodiment of the invention.

Lastly, referring to FIG. 4, a third alternative embodiment of a multiphase DC-to-DC voltage converter 10 is illustrated in accordance with an embodiment of the invention. The embodiment of FIG. 4 is generally similar to that shown in FIG. 3, with the exception that the second current sense signal from each of the converter modules 20, 30 is derived from a common sensing resistor 59 disposed in series with the load 12. Specifically, the sensing resistor 59 is connected in series between the output inductors 23, 33 and the load 12. The voltage across the sensing resistor 59 is measured using a differential amplifier 52 that has inputs connected to either end of the resistor. The output of the differential amplifier 52 provides the second current sense signal to both current sense circuits 28, 38. As in the preceding embodiment, this embodiment does not require a sample and hold circuit for the second current sense signal since the current through the sensing resistor 59 is continuous. In a preferred embodiment of the invention, the sensing resistor 59 would have a very low resistance value in order to reduce the amount of power that is lost by inclusion of the sensing resistor. The current sense circuits 28, 38 would operate in the same manner described above.

Having thus described a preferred embodiment of a method and apparatus for sensing output current in a DC-to-DC voltage converter, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

What is claimed is:

1. In a multi-phase DC-to-DC voltage converter comprising a plurality of converter modules connected to a common load and having a common input voltage source, an output current sensing apparatus comprises:
   a first current sensor adapted to be coupled to an output inductor of at least one of said plurality of converter modules to derive a first current sense signal corresponding to current passing through an internal DC resistance of said at least one output inductor;
   a second current sensor adapted to be coupled to a sensing resistor disposed in series between said common input voltage source and said load to derive a second current sense signal corresponding to current passing through said sensing resistor; and
   a current sense circuit receiving said first and second current sense signals, said current sense circuit filtering said second current sense signal, integrating a difference between said first current sense signal and said filtered second current sense signal, and adjusting said first current sense signal based on said integrated difference, said current sense circuit thereby providing said first current sense signal as a slope signal for controlling a conduction duty cycle of said multi-phase DC-to-DC converter and a DC level signal corresponding to a thermal drift error of said slope signal;
   wherein, said first current sense signal provides a fast indication of output current of said multi-phase DC-to-DC converter that is susceptible to thermal variation of said at least one output inductor, and said second current sense signal provides a slow but accurate indication of output current that is not affected by said thermal variation.

2. The output current sensing apparatus of claim 1, wherein said first current sensor further comprises a resistor and a capacitor connected together in series and connected in parallel with said output inductor of said at least one of said plurality of converter modules.

3. The output current sensing apparatus of claim 1, wherein said sensing resistor is further disposed in series between said common input voltage source and a high-side conduction switch of at least one of said plurality of converter modules.

4. The output current sensing apparatus of claim 2, wherein said second current sensor further comprises a differential amplifier adapted to measure a voltage across said sensing resistor and a sample and hold circuit that stores said voltage for at least one conduction cycle of said multi-phase DC-to-DC converter.

5. The output current sensing apparatus of claim 1, wherein said sensing resistor is further disposed in series between said output inductor of said at least one of said plurality of converter modules and said load.

6. The output current sensing apparatus of claim 5, wherein said second current sensor further comprises a differential amplifier adapted to measure a voltage across said sensing resistor.

7. The output current sensing apparatus of claim 1, wherein said current sense circuit further comprises a filter adapted to remove noise from said second current sense signal.

8. The output current sensing apparatus of claim 1, wherein said current sense circuit further comprises a mixer having a first input receiving said first current sensing signal and a second input receiving a correction signal corresponding to said difference between said first current sense signal and said filtered second current sense signal, said mixer providing said DC level signal as an output therefrom.

9. The output current sensing apparatus of claim 8, wherein said current sense circuit further comprises an integrator receiving a filtered output of said mixer and said filtered second current sense signal, said integrator providing said attenuation signal to said mixer as an output therefrom.

10. The output current sensing apparatus of claim 1, wherein said plurality of converter modules further comprises at least two converter modules.

11. In a multi-phase DC-to-DC voltage converter comprising a plurality of converter modules connected to a common load and having a common input voltage source, a method for sensing output current comprises the steps of:
   deriving a first current sense signal corresponding to current passing through an internal DC resistance of an output inductor of at least one of said plurality of converter modules, said first current sense signal providing a relatively fast indication of output current of said multi-phase DC-to-DC converter that is susceptible to thermal variation of said at least one output inductor;
   deriving a second current sense signal corresponding to current passing through a sensing resistor disposed in series between said common input voltage source and said load, said second current sense signal providing a relatively slow but accurate indication of output current that is not affected by said thermal variation;
   filtering said second current sense signal to remove noise therefrom;
   integrating a difference between said first current sense signal and said filtered second current sense signal; and
   correcting said first current sense signal based on said integrated difference.

12. The method of claim 11, wherein said second deriving step further comprises disposing said sensing resistor in series between said common input voltage source and a high-side conduction switch of at least one of said plurality of converter modules.

13. The method of claim 12, wherein said second deriving step further comprises measuring a voltage across said sensing resistor and storing said voltage for at least one conduction cycle of said multi-phase DC-to-DC converter.

14. The method of claim 11, wherein said second deriving step further comprises disposing said sensing resistor in series between said output inductor of said at least one of said plurality of converter modules and said load.

15. The method of claim 14, wherein said second deriving step further comprises measuring a voltage across said sensing resistor.

16. The method of claim 11, wherein said first deriving step further comprises connecting a resistor and a capacitor together in series and in parallel with said output inductor of said at least one of said plurality of converter modules.

17. A DC-to-DC power converter, comprising:
- at least one power switch having a terminal connected to an input voltage source;
- a pulse width modulation circuit for generating control pulses for said at least one power switch;
- an output inductor connected to said at least one power switch and to a load;
- a first current sensor coupled to said output inductor and deriving a first current sense signal corresponding to current passing through an internal DC resistance of said output inductor;
- a second current sensor coupled to a sensing resistor disposed in series between said input voltage source and said load and deriving a second current sense signal corresponding to current passing through said sensing resistor; and
- a current sense circuit receiving said first and second current sense signals, said current sense circuit filtering said second current sense signal, integrating a difference between said first current sense signal and said filtered second current sense signal, and adjusting said first current sense signal based on said integrated difference, said current sense circuit thereby providing said pulse width modulation circuit with said first current sense signal as a slope signal for controlling a conduction duty cycle of said DC-to-DC converter and a DC level signal corresponding to a thermal drift error of said slope signal;

wherein, said first current sense signal provides a fast indication of output current of said DC-to-DC converter that is susceptible to thermal variation of said at least one output inductor, and said second current sense signal provides a slow but accurate indication of output current that is not affected by said thermal variation.

18. The DC-to-DC converter of claim 17, wherein said sensing resistor is further disposed in series between said common input voltage source and said at least one power switch.

19. The DC-to-DC converter of claim 18, wherein said second current sensor further comprises a differential amplifier adapted to measure a voltage across said sensing resistor and a sample and hold circuit that stores said voltage for at least one conduction cycle of said DC-to-DC converter.

20. The DC-to-DC converter of claim 17, wherein said sensing resistor is further disposed in series between said output inductor and said load.

21. The DC-to-DC converter of claim 20, wherein said second current sensor further comprises a differential amplifier adapted to measure a voltage across said sensing resistor.

22. The DC-to-DC converter of claim 17, wherein said first current sensor further comprises a resistor and a capacitor connected together in series and connected in parallel with said output inductor.

23. The DC-to-DC converter of claim 17, wherein said current sense circuit further comprises a filter adapted to remove noise from said second current sense signal.

24. The DC-to-DC converter of claim 17, wherein said current sense circuit further comprises a mixer having a first input receiving said first current sensing signal and a second input receiving a correction signal corresponding to said difference between said first current sense signal and said filtered second current sense signal, said mixer providing said DC level signal as an output therefrom.

25. The DC-to-DC converter of claim 24, wherein said current sense circuit further comprises an integrator receiving a filtered output of said mixer and said filtered second current sense signal, said integrator providing said correction signal to said mixer as an output therefrom.

* * * * *